United States Patent
Zhu et al.

(10) Patent No.: US 12,091,976 B1
(45) Date of Patent: Sep. 17, 2024

(54) METHOD FOR MONITORING RESILIENCE OF SHIELD TUNNEL BASED ON MULTI-SOURCE HETEROGENEOUS DATA

(71) Applicant: Shenzhen University, Guangdong (CN)

(72) Inventors: Min Zhu, Guangdong (CN); Xiaohua Bao, Guangdong (CN); Changqing Xia, Guangdong (CN); Xiangsheng Chen, Guangdong (CN); Chen Wang, Guangdong (CN); Jiqiang Liu, Guangdong (CN); Dengwei Chen, Guangdong (CN); Shuangxi Guo, Guangdong (CN); Houpu Liu, Guangdong (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 18/446,600

(22) Filed: Aug. 9, 2023

(30) Foreign Application Priority Data

Apr. 11, 2023 (CN) .......................... 202310376513.1

(51) Int. Cl.
*E21D 9/01* (2006.01)
*E21D 9/00* (2006.01)
(Continued)

(52) U.S. Cl.
CPC ............... *E21D 9/01* (2016.01); *E21D 9/003* (2013.01); *E21F 17/18* (2013.01); *E21F 17/185* (2013.01);
(Continued)

(58) Field of Classification Search
CPC E21D 7/005; E21D 9/01; E21D 9/003; E21D 9/004; E21F 17/18; E21F 17/185;
(Continued)

(56) References Cited

FOREIGN PATENT DOCUMENTS

| CN | 102435173 A | 5/2012 |
|----|-------------|--------|
| CN | 108489456 A | 9/2018 |

(Continued)

OTHER PUBLICATIONS

Office Action from related Chinese Appln. No. 202310376513.1, dated May 23, 2023 Original. English translation previously submitted.

(Continued)

*Primary Examiner* — Janine M Kreck
*Assistant Examiner* — Michael A Goodwin
(74) *Attorney, Agent, or Firm* — Grossman, Tucker, Perreault & Pfleger, PLLC

(57) ABSTRACT

A method for monitoring resilience of a shield tunnel based on multi-source heterogeneous data is provided, including following steps: collecting the multi-source heterogeneous data and processing computer data, where the collecting the multi-source heterogeneous data includes: collecting a tunnel displacement u, a tunnel cross section convergence ΔD and a tunnel damage area S; and the processing computer data includes: S1, performing data preprocessing; S2, performing data processing, where the multi-source heterogeneous data preprocessed in step S1 is processed to calculate a tunnel performance indicator P and a tunnel resilience indicator Re; S3, determining tunnel status; S4, performing manual argumentation; S5, giving a remediation measure according to the status of the resilience of the tunnel in step S4; S6, storing and archiving processed data; and S7, performing terminal outputting, where the data obtained in step S6 is displayed and output through a plurality of terminals.

7 Claims, 3 Drawing Sheets

(51) Int. Cl.
*E21F 17/18* (2006.01)
*G01N 21/88* (2006.01)

(52) U.S. Cl.
CPC . *G01N 21/8851* (2013.01); *G01N 2021/8854* (2013.01)

(58) Field of Classification Search
CPC ........ G01N 21/8851; G01N 2021/8854; G01S 17/42; G01S 17/88; G01S 17/89; G01C 7/06
See application file for complete search history.

(56) References Cited

FOREIGN PATENT DOCUMENTS

| | | | |
|---|---|---|---|
| CN | 110132157 A | | 8/2019 |
| CN | 111024037 A | | 4/2020 |
| CN | 115182736 A | * | 10/2022 |
| CN | 115341954 A | * | 11/2022 |

OTHER PUBLICATIONS

Grant of Notice of Patent Right For Invention from related Chinese Appln. No. 202310376513.1, dated Jun. 14, 2023. English Translation Attached.

English translation of Office Action from related Chinese Appln. No. 202310376513.1, dated May 23, 2023.

Chuntao, "In Consideration of Multiple Disturbances", Journal of Geotechnical Engineering, vol. 44, No. 4, Apr. 2022, pp. 591-601. (English Abstract included).

\* cited by examiner

METHOD FOR MONITORING RESILIENCE OF SHIELD TUNNEL BASED ON MULTI-SOURCE HETEROGENEOUS DATA

CROSS REFERENCE TO RELATED APPLICATION

This patent application claims the benefit and priority of Chinese Patent Application No. 202310376513.1 filed on Apr. 11, 2023, the disclosure of which is incorporated by reference herein in its entirety as part of the present application.

TECHNICAL FIELD

The present disclosure relates to the technical field of tunnel monitoring, and in particular to a method for monitoring resilience of a shield tunnel based on multi-source heterogeneous data.

BACKGROUND

With the rapid development of urban rail transit in China in recent years, a lot of metro shield tunnels have been constructed. A shield tunnel features a precast lining structure and thus may be susceptible to changes of surroundings, resulting in structure damages such as cracking, water seepage and spalling, which seriously affect safe operation of metro tunnels. Evaluating safety of an existing tunnel structure is an important precondition of guaranteeing the safety of the structure. Due to relatively simple existing indicators and methods for evaluating a performance of a shield tunnel, it is difficult to comprehensively evaluate safety status of a tunnel structure. The patent for invention No. 201810276462.4 discloses a tunnel monitoring system and a tunnel monitoring method. With the technical solutions disclosed therein, an optical fiber monitoring element is disposed in a concrete layer, and when a tunnel is acted upon by a force, the concrete layer laid on the tunnel may be deformed accordingly, and the optical fiber monitoring element disposed therein is capable of sensing the corresponding deformation, and corresponding parameters have changes in values. A demodulator receives and processes the corresponding changes of the parameters, and conditions such as force and temperature of the tunnel are reflected by variations of data monitored by the optical fiber monitoring element. The above-mentioned structure is capable of realizing real-time monitoring on force conditions such as a water pressure and subsidence of the tunnel and temperature variations of the tunnel, thereby guaranteeing the safety of the tunnel. Although the method is capable of monitoring the status of the tunnel, a lot of optical fibers need to be laid in the concrete layer of the tunnel with a high cost. Moreover, once an optical fiber is damaged, the optical fiber cannot be repaired easily.

SUMMARY

An objective of some embodiments of the present disclosure is to address problems in the prior art and provide a method for monitoring resilience of a shield tunnel based on multi-source heterogeneous data, which solves the problems of high cost and difficultly effective monitoring of a traditional tunnel monitoring method.

To achieve the above objective, the present disclosure provides a method for monitoring resilience of a shield tunnel based on multi-source heterogeneous data, including: collecting the multi-source heterogeneous data and processing computer data, where the collecting the multi-source heterogeneous data includes: collecting a tunnel displacement u, a tunnel cross section convergence $\Delta D$ and a tunnel damage area S; and the processing computer data includes:

S1, performing data preprocessing, wherein data collected in the step of collecting the multi-source heterogeneous data is verified, and when the data meets set criteria, the data is stored; when the data does not meet the set criteria, the data is manually reverified, the data is stored when the data meets the set criteria and the data is deleted when the data does not meet the set criteria;

S2, performing data processing, where the multi-source heterogeneous data preprocessed in step S1 is processed to calculate a tunnel performance indicator P and a tunnel resilience indicator Re;

S3, determining tunnel status, where a status of resilience of the tunnel is determined according to data in step S2;

S4, performing manual argumentation, where a result in step S3 is manually corrected;

S5, giving a remediation measure according to the status of the resilience of the tunnel in step S4;

S6, storing and archiving processed data; and

S7, performing terminal outputting, where the data obtained in step S6 is displayed and output through a plurality of terminals.

In an embodiment, the collecting a tunnel displacement u includes: arranging a cross section composed of a plurality of monitoring prisms at intervals of a certain distance within the tunnel, and acquiring, by an automatic total station, horizontal and vertical displacements of each measuring point.

In an embodiment, the collecting a tunnel cross section convergence $\Delta D$ includes: splicing and fitting point cloud data acquired by a three-dimensional laser scanner to obtain the tunnel cross section convergence $\Delta D$.

In an embodiment, the collecting a tunnel damage area S includes: acquiring, by a plurality of high-definition cameras mounted on a dolly, high-definition photos of a tunnel surface, establishing regular projection views and identifying the tunnel damage area S in the high-definition photos using an image technique.

In an embodiment, the tunnel performance indicator P is calculated by $$P1 = \frac{1}{1+\frac{u_{his}u}{3u_{code}^2}}, P2 = \frac{1}{1+\frac{\Delta D_{his}\Delta D}{3\Delta D_{code}^2}}, P3 = \frac{1}{1+\frac{s_{his}S}{3s_{code}^2}}, \text{ and}$$

$$P = \sqrt{(1-P1)^2 + (1-P2)^2 + (1-P3)^2},$$

where shield tunnel performance indicator components P1, P2 and P3 characterize vertical structural performance, horizontal structural performance and a structure damage extent of the tunnel, respectively, and performance of the tunnel is characterized as a unit in a three-dimensional space coordinate system with vertical performance, horizontal performance and damage extent as coordinate axes;

where subscript his represents a historical maximum of a variable, and subscript code represents a code control value of the variable; and performance indicator components have characteristics that a value range of an indicator is 0 to 1, which is capable of reflecting irreversible effects of historical deformation and damage on a tunnel structure; when deformation and damage area of the tunnel reaches code control values, the performance indicator components are 0.75; and therefore, the performance indicator components are divided into four sections of high, middle, low and extremely low according to 0.75 to 1, 0.5 to 0.75, 0.25 to 0.5, and 0 to 0.25, respectively.

In an embodiment, the tunnel resilience indicator Re of the shield tunnel is calculated according to an evolving curve of lining performance P at different times:

$$\mathrm{Re} = -\frac{\int_{t1}^{t2} P(t)\,dt}{t2 - t1},$$

where P(t) represents the evolving curve of the lining performance of the tunnel over a time period from t1 to t2; and the resilience of the shield tunnel is divided into four grades of high, middle, low and extremely low according to different resilience indicators.

In an embodiment, the deleted data that does not meet the set criteria in step S1 is abnormal data or seriously transnormal data.

In an embodiment, in step S7, a key performance indicator and a structural resilience indicator of the tunnel are displayed and output by a mobile terminal or a WEB page, and transmitted in real time.

In an embodiment, the resilience of the tunnel in step S3 has following statuses: high resilience, middle resilience, low resilience and extremely low resilience; and remediation measures corresponding to different statuses in step S5 are no remediation required, a remediation measure needing to be taken, a remediation measure needing to be taken as quickly as possible, and a remediation measure needing to be taken immediately, respectively.

The present disclosure has the following beneficial effects: the present disclosure allows for comprehensive monitoring on the tunnel by collecting a variety of data and has advantages of reliable monitoring result, small error, high reliability, low monitoring cost, while allows for automatic classification of tunnel statuses and alarming with high automation degree.

BRIEF DESCRIPTION OF THE DRAWINGS

The above-mentioned and other features, properties and advantages of the present disclosure will become more apparent from the following description in conjunction with the accompanying drawings and embodiments. Like reference numerals denote like features throughout the drawings, in which.

Figure 1:
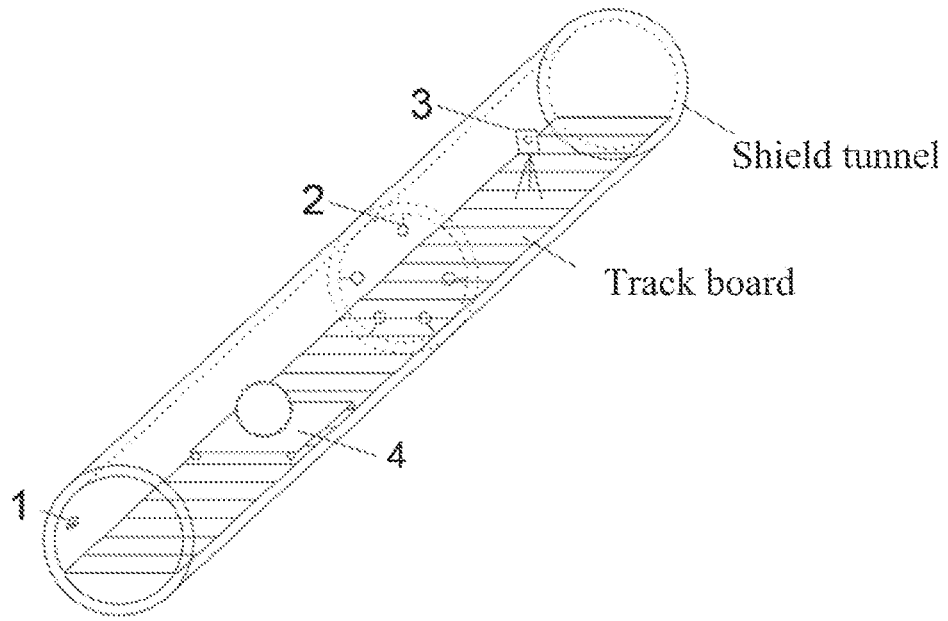
FIG. 1 is a schematic diagram of collection of data within a tunnel.
Figure 2:
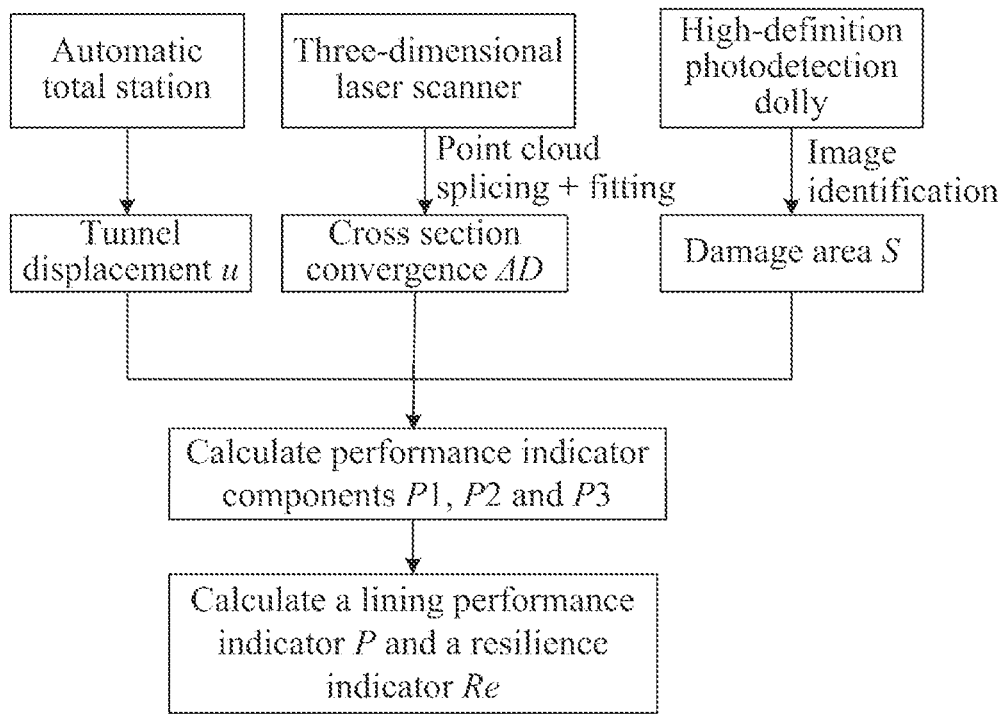
FIG. 2 is a schematic diagram of a method of acquiring a resilience indicator.
Figure 3:
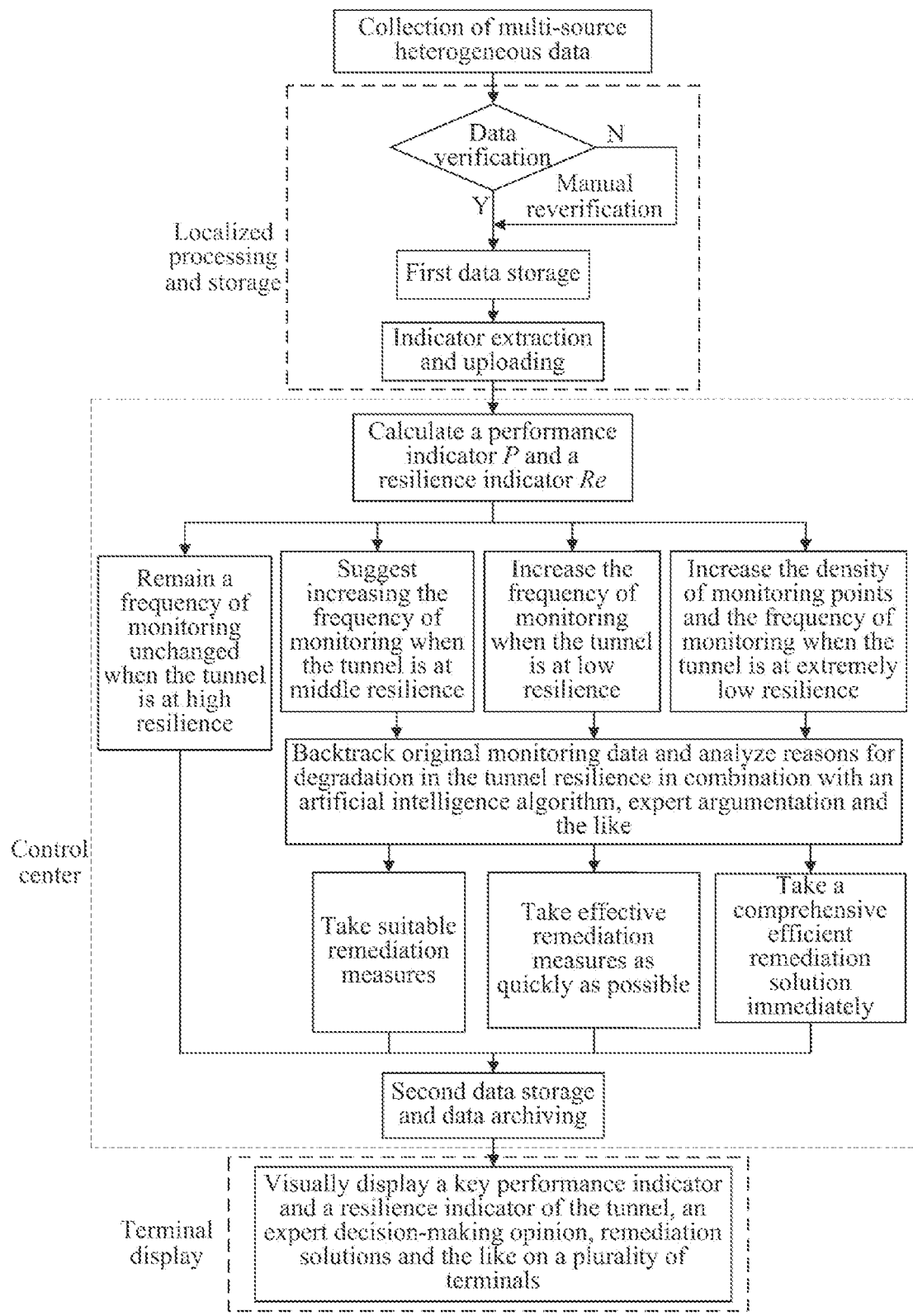
FIG. 3 is a schematic diagram of a tunnel resilience evaluation system.

List of Reference Numerals: 1—automatic total station, 2—monitoring prism, 3—three-dimensional laser scanner, and 4—high-definition photodetection robot.

DETAILED DESCRIPTION OF THE EMBODIMENTS

With reference to FIG. 1 to FIG. 4, the present disclosure provides a method for monitoring resilience of a shield tunnel based on multi-source heterogeneous data, including: collecting the multi-source heterogeneous data and processing computer data, where the collecting the multi-source heterogeneous data includes: collect a tunnel displacement u, a tunnel cross section convergence ΔD and a tunnel damage area S. The data in the step is mainly stored and processed locally, avoiding a delay caused by transmission of mass data.

The processing computer data includes steps S1-S7.

In step S1, data preprocessing is performed, where data collected in the step of collecting the multi-source heterogeneous data is verified, and when the data meets set criteria, the data is stored, when the data does not meet the set criteria, the data is manually reverified. The data is stored when the manually reverified data meets the set criteria and the data is deleted when the manually reverified data does not meet the set criteria.

In step S2, data processing is performed, where the multi-source heterogeneous data preprocessed in step S1 is processed to calculate a tunnel performance indicator P and a tunnel resilience indicator Re.

In step S3, tunnel status is determined, where a status of resilience of the tunnel is determined according to data in step S2.

In step S4, manual argumentation is performed, where a result in step S3 is manually corrected.

In step S5, a remediation measure is correspondingly given according to the status of the resilience of the tunnel in step S4.

In step S6, processed data is stored and archived. Performance indicator components P1, P2 and P3 are calculated by using a key indicator of the tunnel, and a time-varying curve of the tunnel performance indicator P is calculated to obtain the tunnel resilience indicator Re. The resilience of the tunnel is then evaluated. When the tunnel is at high resilience, a frequency of monitoring remains unchanged. When the tunnel is at middle resilience, low resilience and extremely low resilience, it indicates that the tunnel indicator is already close to or exceeds a code control value. In this case, the multi-source heterogeneous data of a first phase should be extracted for verification, and by combining artificial intelligence, expert decision-making and the like, reasons for degradation in the tunnel resilience are found out and corresponding solutions are proposed. When the tunnel is at middle resilience, a suitable remediation measure should be taken. When the tunnel is at low resilience, effective remediation measures should be taken as quickly as possible, and the frequency of monitoring is increased. When the tunnel is at extremely low resilience, a comprehensive efficient remediation solution should be adopted immediately, and density of monitoring points and the frequency of monitoring are increased. Finally, all data, indicators and solutions are stored and archived.

In step S7, terminal outputting is performed, where the data obtained in step S6 is displayed and output through a plurality of terminals.

As shown in FIG. 1, the collecting a tunnel displacement u includes: performing measurement by using an automatic total station, setting measuring points by using monitoring prisms, arranging a cross section composed of a plurality of monitoring prisms at intervals of a certain distance within the tunnel, and acquiring, by the automatic total station, horizontal and vertical displacements of each measuring point. A distance between two cross sections composed of the monitoring prisms is greater than 5 m, and a distance between the automatic total station and the cross section composed of the monitoring prisms is greater than 10 m. The number of the cross sections composed of the monitoring prisms is 2.

As shown in FIG. 1, the collecting a tunnel cross section convergence ΔD includes: splicing and fitting point cloud data acquired by a three-dimensional laser scanner to obtain the tunnel cross section convergence ΔD. The three-dimensional laser scanner emits a laser beam having sufficient strength to a measured object. The laser beam is reflected by the measured object and then received by a terrestrial three-dimensional laser scanner. A distance S between a center of the terrestrial three-dimensional laser scanner and a scanned object is calculated by measuring a time difference (a phase difference) between emission of a laser signal from and return to the three-dimensional laser scanner, and meanwhile, the scanner may automatically record a horizontal angle a and a vertical angle θ of the measured object acquired by an angle encoder. The terrestrial three-dimensional laser scanner accurately controls rapid rotation of a retroreflection prism by means of a servo motor therein, to achieve scanning of the measured object at different positions. In the terrestrial three-dimensional laser scanner, a ranging laser beam rotates around two axes perpendicular to each other, and an intersection point of the two axes is an origin 0 of an internal coordinate system of the terrestrial three-dimensional laser scanner. A horizontal axis (or a first rotation axis) of the terrestrial three-dimensional laser scanner is a Y-axis of the internal coordinate system, and a vertical axis (a second rotation axis) forms a Z-axis of the coordinate system. According to a construction principle of a right-handed coordinate system, a X-axis is perpendicular to the Y-axis and the Z-axis. When the terrestrial three-dimensional laser scanner performs scanning, the distance S between the origin 0 of the coordinate system and the measured object Q, a horizontal angle a and a vertical angle θ are measured by an instrument, and spatial three-dimensional coordinates Q) (X,Y,Z) of a target point are calculated by following equation $$\begin{cases} X = S\cos\theta\cos\alpha \\ Y = S\cos\theta\sin\alpha \\ Z = S\sin\theta \end{cases},$$

and horizontal convergent deformation of waist of a tunnel segment is measured by the three-dimensional laser scanner to obtain point cloud data of a tunnel cross section. Point cloud splicing is a process of integrating point clouds of different reference coordinate systems into one coordinate system. An arbitrary measuring station coordinate system is adopted for each station during scanning, and therefore, splicing of point clouds is substantially transformation of coordinate systems. Splicing is divided into target-free splicing and target-based splicing. The target-free splicing has the following disadvantages that many overlapping regions need to be scanned and an object having an obvious feature needs to be searched, and therefore, the efficiency and accuracy of such splicing are inferior to those of the target-based splicing. Thus, the target-based splicing is adopted during the current scanning. A purpose of point cloud slicing is to prepare for point cloud fitting. A general method for intercepting a cross section of the point cloud data of the tunnel includes: performing global surface fitting on the entire tunnel and then intercepting a cross section of the tunnel surface along a certain reference direction. For metro tunnel data, a metro tunnel generally has a long mileage and the volume of three-dimensional point cloud data is large. If global fitting and cross section intercepting are performed on all the point cloud data by the above method, a lot of calculation time will be certainly consumed and the efficiency of data processing may be greatly reduced. In the cross section processing of the data obtained in the current scanning, joint seams between loops are used to replace the global surface fitting of the tunnel and extraction of central axes in the tunnel, which not only may avoid the huge computation burden of global fitting, but also effectively reduces the computational costs. Meanwhile, the interference caused by locally adjusting a central axis at a bend of the tunnel is also avoided, thus guaranteeing the accuracy of surface fitting. The fitting of point clouds refers to fitting point cloud data by a certain mathematical method, thereby obtaining geometrical parameters of the point cloud cross section. The extraction and analysis of deformation information refer to extracting parameters of point cloud fitting for comparison and analysis. Although the point cloud data has mass three-dimensional point coordinates of the surface of the observed object and has a millimeter-level spatial resolution, all three-dimensional points are discrete. Hence, it cannot be guaranteed that there is a corresponding laser point at each interception position. Thus, it is needed to perform surface fitting on an intercepted region and interpolation to obtain point coordinates of the desired position, so as to achieve the purpose of intercepting the cross section. While circle fitting may be used to entirely reflect subsidence and convergence of the tunnel, it is not ideal in local fitting and cannot specifically reflect a deformation value of the segment at a position where a force is applied and cannot reflect a curvature radius of the segment at a joint. A tunnel constructed by a shield method in a soft soil area is affected by a balanced load, a live load and a dynamic load, and a deformation curve thereof is a nonstandard ellipse having a vertical diameter greater than a horizontal diameter, i.e., a shape of a "horizontal duck egg". Therefore, in order to further analyze the transverse deformation of the tunnel and the deformation of the segment by force, a point cloud curve must be fitted accurately. A cubic uniform spline interpolation curve is adopted for processing the data obtained in the current scanning. Collecting the tunnel damage area S includes: acquiring, by a plurality of high-definition cameras mounted on a dolly, high-definition photos of a tunnel surface, establishing regular projection views and identifying the tunnel damage area S in the high-definition photos using an image technique. There are two ways of identifying the damage area, where one is by an image identification algorithm, and the other one is by human assisted identification. The number of the high-definition cameras is 2.

The tunnel performance indicator P is calculated by:

$$P1 = \frac{1}{1 + \frac{u_{his}u}{3u_{code}^2}}, P2 = \frac{1}{1 + \frac{\Delta D_{his}\Delta D}{3\Delta D_{code}^2}}, P3 = \frac{1}{1 + \frac{s_{his}s}{3s_{code}^2}}, \text{ and}$$

$$P = \sqrt{(1-P1)^2 + (1-P2)^2 + (1-P3)^2},$$

where shield tunnel performance indicator components P1, P2 and P3 characterize vertical structural performance, horizontal structural performance and a structure damage extent of the tunnel, respectively, and performances of the tunnel is characterized as a unit in a three-dimensional space coordinate system with vertical performance, horizontal performance and damage extent as coordinate axes; where subscript his represents a historical maximum of a variable, and subscript code represents a code control value of the variable. The performance indicator components have characteristics that a value range of an indicator is 0 to 1, which is capable of reflecting irreversible effects of historical deformation and damage on a tunnel structure. When a deformation and damage area of the tunnel reaches the code control values, the performance indicator components are 0.75. Therefore, the performance indicator components are divided into four sections of high, middle, low and extremely low according to 0.75 to 1, 0.5 to 0.75, 0.25 to 0.5, and 0 to 0.25, respectively.

The resilience indicator Re of the shield tunnel is calculated according to an evolving curve of lining performance P at different times:

$$\text{Re} = \frac{\int_{t1}^{t2} P(t)\, dt}{t2 - t1},$$

where P(t) represents the evolving curve of the lining performance of the tunnel over a time period from t1 to t2; and the resilience of the lining structure of the shield tunnel is divided into four grades of high, middle, low and extremely low according to different resilience indicators.

The deleted data that does not meet the set criteria in step S1 is abnormal data or seriously transnormal data. In step S7, a key performance indicator and a structural resilience indicator of the tunnel are displayed and output by a mobile terminal or a WEB page, and transmitted in real time. Data may be transmitted to on-site management and inspection personnel, and warnings are issued in cases of middle, low, and extremely low resilience, to timely transmit expert decision-making opinions and remediation solutions. The resilience of the tunnel in step S3 has following statuses: high resilience, middle resilience, low resilience and extremely low resilience; and the remediation measures corresponding to different statuses in step S5 are no remediation required, a remediation measure needing to be taken, a remediation measure needing to be taken as quickly as possible, and a remediation measure needing to be taken immediately, respectively.

Figure 4:
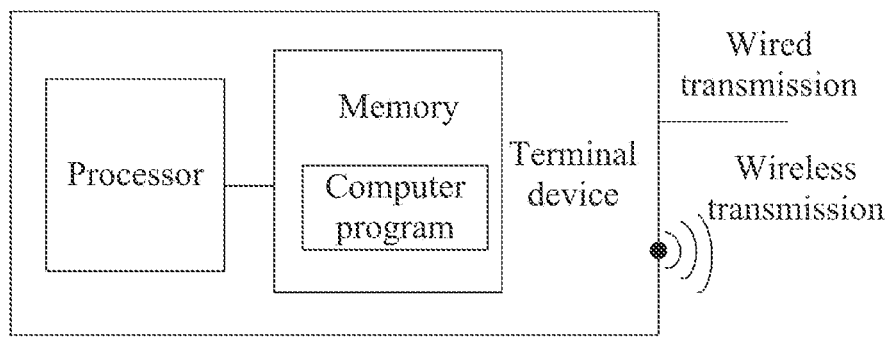
FIG. 4 is a schematic diagram of a terminal device.

As shown in FIG. 4, the terminal used in terminal outputting in step S4 may be a desk computer, a notebook computer, a palm computer, a mobile phone or a cloud server. The terminal includes at least one processor, one memory, and a computer program stored in the memory and running on at least one processor. The computer program is capable of receiving and displaying the above data and solutions, and realizing alarming on a low resilience status. The processor may be a central processing unit (CPU) or other general-purpose processor capable of realizing desired functions, etc. The memory may be an internal storage unit of a terminal device, such as a hard disk or a memory, or an external storage device, such as a plug-in hard disk, a secure digital (SD) card or a flash card. The memory is configured to store an operating system, applications, bootloaders and related data, etc. Moreover, the terminal device is capable of transmitting data via a wireless or wired network and a control center.

The above embodiments are provided to illustrate the present disclosure, but not to limit the present disclosure. Any solution obtained by making a simple modification to the present disclosure shall fall within the protection scope of the present disclosure.

What is claimed:

1. A method for monitoring resilience of a shield tunnel based on multi-source heterogeneous data, comprising: obtaining the multi-source heterogeneous data and processing computer data,
    wherein the obtaining the multi-source heterogeneous data comprises: obtaining a tunnel displacement u, a tunnel cross section convergence ΔD and a tunnel damage area S; and
    the processing computer data comprises:
        S1, performing data preprocessing, wherein data obtained in the step of obtaining the multi-source heterogeneous data is verified, and when the data meets predefined criteria, the data is stored; when the data does not meet the predefined criteria, the data is manually reverified, the data is stored when the data meets the predefined criteria and the data is deleted when the data does not meet the predefined criteria;
        S2, performing data processing, wherein the multi-source heterogeneous data preprocessed in step S1 is processed to calculate a tunnel performance indicator P and a tunnel resilience indicator Re;
        S3, determining tunnel status, wherein a status of resilience of the tunnel is determined according to data in step S2;
        S4, manually correcting a result in step S3;
        S5, giving a remediation measure according to the status of the resilience of the tunnel in step S4;
        S6, storing and archiving processed data; and
        S7, performing terminal outputting, wherein the data obtained in step S6 is displayed and output through a plurality of terminals;
    wherein the tunnel performance indicator P is calculated by $$P1 = \frac{1}{1 + \frac{u_{his}u}{3u_{code}^2}}, \quad P2 = \frac{1}{1 + \frac{\Delta D_{his}\Delta D}{3\Delta D_{code}^2}}, \quad P3 = \frac{1}{1 + \frac{s_{his}S}{3s_{code}^2}}, \text{ and}$$

$$P = \sqrt{(1-P1)^2 + (1-P2)^2 + (1-P3)^2},$$

wherein shield tunnel performance indicator components P1, P2 and P3 characterize vertical performance, horizontal performance and damage extent of the tunnel, respectively, and performance of the tunnel is characterized as a unit in a three-dimensional space coordinate system with vertical performance, horizontal performance and damage extent as coordinate axes; wherein subscript his represents a historical maximum of a variable, and subscript code represents a code control value of the variable; and performance indicator components have characteristics that a value range of an indicator is 0 to 1, which is capable of reflecting irreversible effects of historical deformation and damage on a tunnel structure; when deformation and damage area of the tunnel reaches code control values, the performance indicator components are 0.75; and therefore, the performance indicator components are divided into four sections of high, middle, low and extremely low according to 0.75 to 1, 0.5 to 0.75, 0.25 to 0.5, and 0 to 0.25, respectively; wherein the obtaining a tunnel cross section convergence ΔD comprises: splicing and fitting point cloud data acquired by a three-dimensional laser scanner to obtain the tunnel cross section convergence ΔD.

2. The method according to claim 1, wherein the obtaining a tunnel displacement u comprises:
arranging a cross section composed of a plurality of monitoring prisms at intervals of a certain distance within the tunnel, wherein each monitoring prism is used as a measuring point; and
acquiring, by a total station, horizontal and vertical displacements of each measuring point.

3. The method according to claim 1, wherein the obtaining a tunnel damage area S comprises: acquiring, by a plurality of high-definition cameras mounted on a dolly, photos of a tunnel surface, establishing an orthophotograph based on the photos of the tunnel surface, and identifying the tunnel damage area S in the orthophotograph using an image technique.

4. The method according to claim 1, wherein the tunnel resilience indicator Re of the shield tunnel is calculated according to an evolving curve of the tunnel performance indicator P at different times:

$$Re = -\frac{\int_{t1}^{t2} P(t)\,dt}{t2-t1},$$

wherein P(t) represents the evolving curve of the tunnel performance indicator over a time period from t1 to t2; and the resilience of the shield tunnel is divided into four grades of high, middle, low and extremely low according to different resilience indicators.

5. The method according to claim 1, wherein in step S7, a key performance indicator and a structural resilience indicator of the tunnel are displayed and output by a mobile terminal or a WEB page, and transmitted in real time.

6. The method according to claim 1, wherein the resilience of the tunnel in step S3 has following statuses: high resilience, middle resilience, low resilience and extremely low resilience; and restoration measures corresponding to different statuses in step S5 are no restoration required, a reinforcement measure needing to be taken, a reinforcement measure needing to be taken as quickly as possible, and a reinforcement measure needing to be taken immediately, respectively.

7. A method for monitoring resilience of a shield tunnel based on multi-source heterogeneous data, comprising: obtaining the multi-source heterogeneous data and processing computer data,
wherein the obtaining the multi-source heterogeneous data comprises: obtaining a tunnel displacement u, a tunnel cross section convergence ΔD and a tunnel damage area S; and
the processing computer data comprises:
S1, performing data preprocessing, wherein data obtained in the step of obtaining the multi-source heterogeneous data is verified, and when the data meets predefined criteria, the data is stored; when the data does not meet the predefined criteria, the data is manually reverified, the data is stored when the data meets the predefined criteria and the data is deleted when the data does not meet the predefined criteria;
S2, performing data processing, wherein the multi-source heterogeneous data preprocessed in step S1 is processed to calculate a tunnel performance indicator P and a tunnel resilience indicator Re;
S3, determining tunnel status, wherein a status of resilience of the tunnel is determined according to data in step S2;
S4, giving a remediation measure according to the status of the resilience of the tunnel in step S3;
S5, storing and archiving processed data; and
S6, performing terminal outputting, wherein the data obtained in step S5 is displayed and output through a plurality of terminals;
wherein the tunnel performance indicator P is calculated by $$P1 = \frac{1}{1+\frac{u_{his}u}{3u_{code}^2}},\ P2 = \frac{1}{1+\frac{\Delta D_{his}\Delta D}{3\Delta D_{code}^2}},\ P3 = \frac{1}{1+\frac{S_{his}S}{3s_{code}^2}},\ \text{and}$$

$$P = \sqrt{(1-P1)^2 + (1-P2)^2 + (1-P3)^2},$$

wherein shield tunnel performance indicator components P1, P2 and P3 characterize vertical performance, horizontal performance and damage extent of the tunnel, respectively, and performance of the tunnel is characterized as a unit in a three-dimensional space coordinate system with vertical performance, horizontal performance and damage extent as coordinate axes; wherein subscript his represents a historical maximum of a variable, and subscript code represents a code control value of the variable; and performance indicator components have characteristics that a value range of an indicator is 0 to 1, which is capable of reflecting irreversible effects of historical deformation and damage on a tunnel structure; when deformation and damage area of the tunnel reaches code control values, the performance indicator components are 0.75; and therefore, the performance indicator components are divided into four sections of high, middle, low and extremely low according to 0.75 to 1, 0.5 to 0.75, 0.25 to 0.5, and 0 to 0.25, respectively;
wherein the obtaining a tunnel cross section convergence ΔD comprises: splicing and fitting point cloud data acquired by a three-dimensional laser scanner to obtain the tunnel cross section convergence ΔD.

* * * * *